United States Patent
Kang et al.

(10) Patent No.: US 12,033,306 B2
(45) Date of Patent: Jul. 9, 2024

(54) CAMERA DEVICE AND ELECTRONIC APPARATUS INCLUDING THE SAME

(71) Applicant: LG ELECTRONICS INC., Seoul (KR)

(72) Inventors: Wonseok Kang, Seoul (KR); Junghee Eim, Seoul (KR); Sangjin Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 438 days.

(21) Appl. No.: 17/422,114

(22) PCT Filed: Jan. 10, 2020

(86) PCT No.: PCT/KR2020/000515
§ 371 (c)(1),
(2) Date: Jul. 9, 2021

(87) PCT Pub. No.: WO2020/145744
PCT Pub. Date: Jul. 16, 2020

(65) Prior Publication Data
US 2022/0114703 A1    Apr. 14, 2022

(30) Foreign Application Priority Data

Jan. 11, 2019    (KR) .................... 10-2019-0003612

(51) Int. Cl.
*G06T 5/00*    (2024.01)
*G06T 3/40*    (2006.01)
(Continued)

(52) U.S. Cl.
CPC ............... *G06T 5/70* (2024.01); *G06T 3/40* (2013.01); *G06T 5/50* (2013.01); *G06T 7/194* (2017.01);
(Continued)

(58) Field of Classification Search
CPC ............ G06T 5/002; G06T 3/40; G06T 5/50; G06T 7/194; G06T 2207/10024;
(Continued)

(56) References Cited

U.S. PATENT DOCUMENTS

2015/0116529 A1    4/2015  Wu et al.
2018/0349008 A1*  12/2018  Manzari ................. H04N 23/62

FOREIGN PATENT DOCUMENTS

CN    103854303 A  *  6/2014
JP    2010-268052 A    11/2010
(Continued)

OTHER PUBLICATIONS

Korinevskaya et al., "Fast Depth Map Super-Resolution using Deep Neural Network", 2018 IEEE International Symposium on Mixed and Augmented Reality Adjunct (ISMAR-Adjunct), Oct. 16, 2018, pp. 117-122.

*Primary Examiner* — Mekonen T Bekele
(74) *Attorney, Agent, or Firm* — Birch, Stewart, Kolasch & Birch, LLP

(57) ABSTRACT

The present disclosure relates to a camera device. The camera device and an electronic apparatus including the same according to an embodiment of the present disclosure include: a color camera; an IR camera; and a processor configured to separate a foreground region and a background region of an IR image from the IR camera, and to filter a color image from the color camera based on the separated foreground or background region, and generate a bokeh image for the color image. Accordingly, by using the IR image from the IR camera, the bokeh image for the color image from the color camera may be simply generated.

12 Claims, 26 Drawing Sheets

(51) Int. Cl.
  *G06T 5/50* (2006.01)
  *G06T 5/70* (2024.01)
  *G06T 7/194* (2017.01)

(52) U.S. Cl.
  CPC .............. *G06T 2207/10024* (2013.01); *G06T 2207/10048* (2013.01); *G06T 2207/20016* (2013.01); *G06T 2207/20024* (2013.01)

(58) Field of Classification Search
  CPC ........... G06T 2207/10048; G06T 2207/20016; G06T 2207/20024; H04N 23/10; H04N 23/45; H04N 23/90; H04N 5/272; H04N 5/2621; H04N 23/80; H04N 13/25; H04N 5/33; H04N 13/15; H04N 13/128; H04N 13/239; H04N 13/257
  See application file for complete search history.

(56) References Cited

FOREIGN PATENT DOCUMENTS

| | | |
|---|---|---|
| KR | 10-2006-0062890 A | 6/2006 |
| KR | 10-2015-0006755 A | 1/2015 |
| KR | 10-1610432 B1 | 4/2016 |
| KR | 10-2017-0097469 A | 8/2017 |
| KR | 10-2018-0047724 A | 5/2018 |

\* cited by examiner

FIG. 5A
(a)
(b)
FIG. 5B

FIG. 10D
(a) 
(b) 

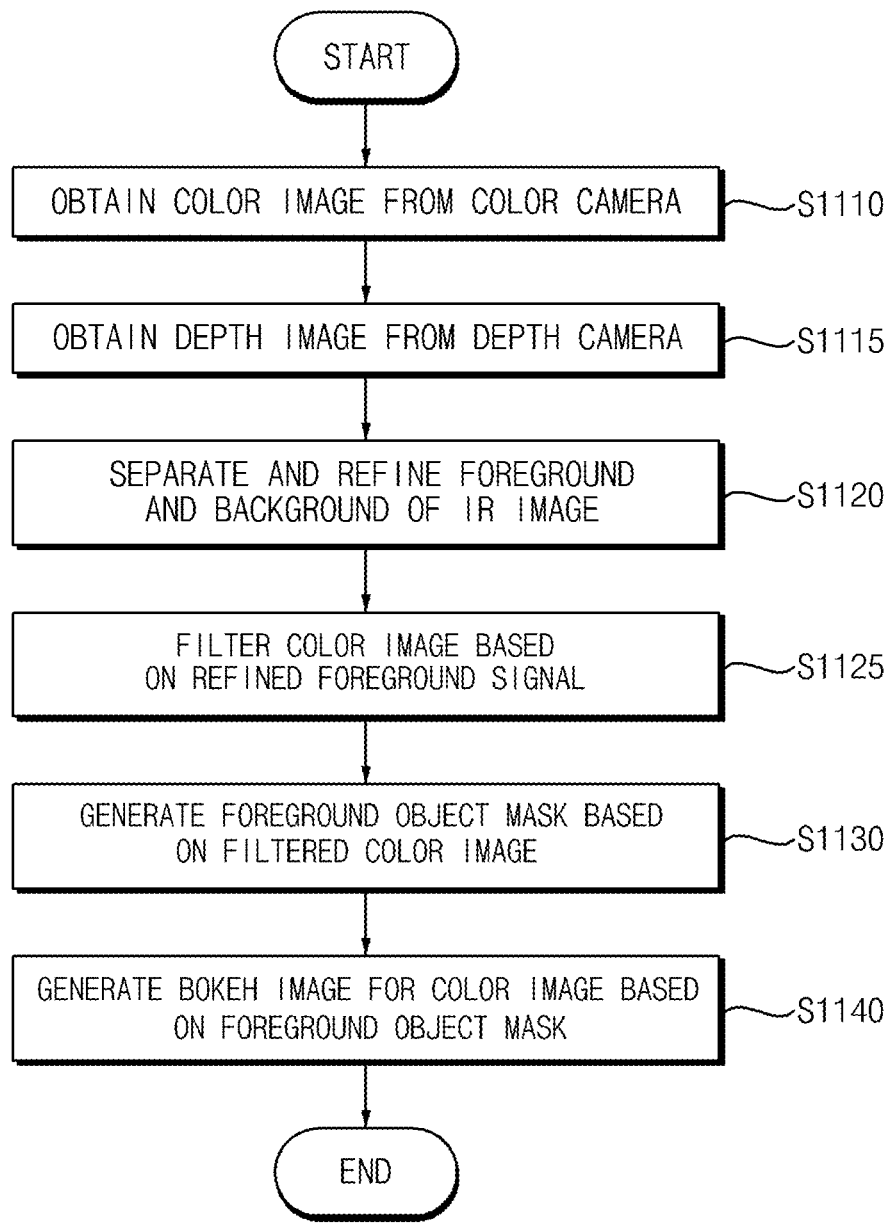

CAMERA DEVICE AND ELECTRONIC APPARATUS INCLUDING THE SAME

CROSS REFERENCE TO RELATED APPLICATIONS

This application is the National Phase of PCT International Application No. PCT/KR2020/000515, filed on Jan. 10, 2020, which claims priority under 35 U.S.C. 119(a) to Patent Application No. 10-2019-0003612, filed in Republic of Korea on Jan. 11, 2019, all of which are hereby expressly incorporated by reference into the present application.

BACKGROUND OF THE DISCLOSURE

1. Field of the Disclosure

The present disclosure relates to a camera device and an electronic apparatus including the same, and more particularly to a camera device and an electronic apparatus including the same, in which a bokeh image for a color image from a color camera may be simply generated by using an IR image from an IR camera.

2. Description of the Related Art

A camera device is an image capturing device. Recently, cameras are employed in various electronic devices.

Meanwhile, the camera device may include a plurality of cameras.

For example, the camera device may include two color cameras or may include one color camera and one IR camera.

Meanwhile, in the case where the camera device includes the color camera and the IR camera, various effects may be obtained by combining the color image from the color camera and the IR image from the IR image.

SUMMARY

It is an object of the present disclosure to provide a camera device and an electronic apparatus including the same, in which a bokeh image for a color image from a color camera may be simply generated by using an IR image from an IR camera.

It is another object of the present disclosure to provide a camera device having no bracket in the color camera and the IR camera, and an electronic apparatus including the same.

TECHNICAL SOLUTION

In accordance with an aspect of the present disclosure, the above and other objects can be accomplished by providing a camera device and an electronic apparatus including the same, which include: a color camera; an IR camera; and a processor configured to separate a foreground region and a background region of an IR image from the IR camera, and to filter a color image from the color camera based on the separated foreground or background region, and generate a bokeh image for the color image.

Meanwhile, the processor may separate a foreground region and a background region of an IR image from the IR camera, and may filter a color image from the color camera based on the separated foreground region, and generate the bokeh image for the color image.

Meanwhile, the processor may generate a foreground object mask based on the filtered color image, and may generate the bokeh image for the color image based on the foreground object mask.

Meanwhile, the processor may downscale a color image from the color camera, and may filter the downscaled color image based on the foreground region separated from the IR image.

Meanwhile, the processor may downscale a color image from the color camera, may upscale the filtered and downscaled color image, and may filter the downscaled color image based on the upscaled color image.

Meanwhile, the processor may generate a foreground object mask based on the filtered and downscaled color image.

Meanwhile, the processor may downscale a color image from the color camera, may filter the downscaled color image based on the foreground object mask, may upscale the filtered color image and the foreground object mask, and may synthesize the upscaled color image with the upscaled foreground object mask to generate the bokeh mask.

Meanwhile, the foreground region may include a face region, wherein in the bokeh image, the face region may be clearer than the background region.

Meanwhile, the processor may include: a foreground/background separator configured to separate a foreground region and a background region of an IR image from the IR camera; a foreground filter configured to filter the foreground region; a foreground refiner configured to refine the filtered foreground region; a background filter configured to filter the background region; and a background refiner configured to refine the filtered background region.

Meanwhile, the processor may include: a downscaler configured to downscale a color image from the color camera; a first filter configured to filter the downscaled color image based on the foreground region separated from the IR image; a boundary refiner configured to refine a boundary signal of the color image from the first filter; and a second filter configured to filter the signal from the boundary refiner.

Meanwhile, the processor may further include: a second downscaler configured to downscale a color image from the color camera; an upscaler configured to upscale the signal from the second filter; a third filter configured to filter the color image, downscaled by the second downscaler, based on the signal from the upscaler; a second boundary refiner configured to refine a boundary signal of the color image from the third filter; and a fourth filter configured to filter the signal from the second boundary refiner.

Meanwhile, the processor may further include: a second upscaler configured to upscale the downscaled color image from the fourth filter; and a fifth filter configured to filter a signal from the second upscaler to output a foreground object mask.

Meanwhile, the processor may include: a third downscaler configured to downscale a color image from the color camera; a sixth filter configured to filter the color image from the third downscaler based on the foreground object mask; a third upscaler configured to upscale the color image from the sixth filter; a fourth upscaler configured to upscale the foreground object mask; and a synthesizer configured to synthesize signals from the third upscaler and the fourth upscaler to output the bokeh image.

Meanwhile, the color camera and the IR camera may be connected by a connection member, wherein the connection member may be flexible.

Effects of the Disclosure

A camera device and an electronic apparatus including the same according to an embodiment of the present disclosure include: a color camera; an IR camera; and a processor configured to separate a foreground region and a background region of an IR image from the IR camera, and to filter a color image from the color camera based on the separated foreground or background region, and generate a bokeh image for the color image. Accordingly, by using the IR image from the IR camera, the bokeh image for the color image from the color camera may be simply generated.

Meanwhile, the processor may separate a foreground region and a background region of an IR image from the IR camera, and may filter a color image from the color camera based on the separated foreground region, and generate the bokeh image for the color image. Accordingly, by using the IR image from the IR camera, the bokeh image for the color image from the color camera may be simply generated.

Meanwhile, the processor may generate a foreground object mask based on the filtered color image, and may generate the bokeh image for the color image based on the foreground object mask. Accordingly, by using the IR image from the IR camera, the bokeh image for the color image from the color camera may be simply generated.

Meanwhile, the processor may downscale a color image from the color camera, and may filter the downscaled color image based on the foreground region separated from the IR image. Accordingly, by using the IR image from the IR camera, the bokeh image for the color image from the color camera may be simply generated.

Meanwhile, the processor may downscale a color image from the color camera, may upscale the filtered and downscaled color image, and may filter the downscaled color image based on the upscaled color image. Accordingly, by using the IR image from the IR camera, the bokeh image for the color image from the color camera may be simply generated.

Meanwhile, the processor may generate a foreground object mask based on the filtered and downscaled color image. Accordingly, by using the IR image from the IR camera, the bokeh image for the color image from the color camera may be simply generated.

Meanwhile, the processor may downscale a color image from the color camera, may filter the downscaled color image based on the foreground object mask, may upscale the filtered color image and the foreground object mask, and may synthesize the upscaled color image with the upscaled foreground object mask to generate the bokeh mask. Accordingly, by using the IR image from the IR camera, the bokeh image for the color image from the color camera may be simply generated.

Meanwhile, the foreground region may include a face region, wherein in the bokeh image, the face region may be clearer than the background region. Accordingly, the bokeh image with a clear face region and a blurred background region may be simply generated.

Meanwhile, the processor may include: a foreground/background separator configured to separate a foreground region and a background region of an IR image from the IR camera; a foreground filter configured to filter the foreground region; a foreground refiner configured to refine the filtered foreground region; a background filter configured to filter the background region; and a background refiner configured to refine the filtered background region. Accordingly, by using the IR image from the IR camera, the bokeh image for the color image from the color camera may be simply generated.

Meanwhile, the processor may include: a downscaler configured to downscale a color image from the color camera; a first filter configured to filter the downscaled color image based on the foreground region separated from the IR image; a boundary refiner configured to refine a boundary signal of the color image from the first filter; and a second filter configured to filter the signal from the boundary refiner. Accordingly, by using the IR image from the IR camera, the bokeh image for the color image from the color camera may be simply generated.

Meanwhile, the processor may further include: a second downscaler configured to downscale a color image from the color camera; an upscaler configured to upscale the signal from the second filter; a third filter configured to filter the color image, downscaled by the second downscaler, based on the signal from the upscaler; a second boundary refiner configured to refine a boundary signal of the color image from the third filter; and a fourth filter configured to filter the signal from the second boundary refiner. Accordingly, by using the IR image from the IR camera, the bokeh image for the color image from the color camera may be simply generated.

Meanwhile, the processor may further include: a second upscaler configured to upscale the downscaled color image from the fourth filter; and a fifth filter configured to filter a signal from the second upscaler to output a foreground object mask. Accordingly, by using the IR image from the IR camera, the bokeh image for the color image from the color camera may be simply generated.

Meanwhile, the processor may include: a third downscaler configured to downscale a color image from the color camera; a sixth filter configured to filter the color image from the third downscaler based on the foreground object mask; a third upscaler configured to upscale the color image from the sixth filter; a fourth upscaler configured to upscale the foreground object mask; and a synthesizer configured to synthesize signals from the third upscaler and the fourth upscaler to output the bokeh image. Accordingly, by using the IR image from the IR camera, the bokeh image for the color image from the color camera may be simply generated.

Meanwhile, the color camera and the IR camera may be connected by a connection member, wherein the connection member may be flexible.

BRIEF DESCRIPTION OF THE DRAWINGS

FIGS. 4A to 5C are diagrams referred to in the description of an operation of the camera device of FIG. 3B.

FIG. 11 is a flowchart illustrating an operating method of a camera device according to an embodiment of the present disclosure.

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in the preparation of the specification, and do not carry any important meaning or role. Therefore, the suffixes "module" and "unit" may be used interchangeably.

Figure 1A:
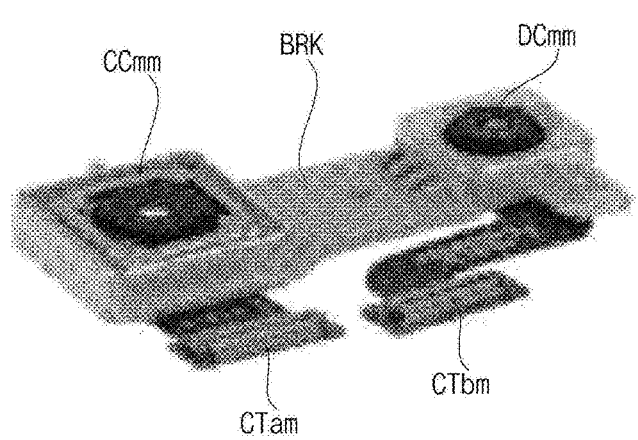
FIG. 1A is a diagram illustrating the appearance of a camera device related to the present disclosure.

FIG. 1A is a diagram illustrating the appearance of a camera device related to the present disclosure.

Referring to the drawing, an example is illustrated in which a camera device 100m includes a color camera CCmm, an IR camera DCmm, a bracket BRK for fixing the color camera CCmm and the IR camera DCmm, an interface CTam of the color camera CCmm, an interface CTbm of the IR camera DCmm.

Due to the bracket BRK for fixing the color camera CCmm and the IR camera DCmm in the camera device 100m according to FIG. 1A, there may be limitations in designing a space of the camera device 100m or an electronic apparatus in which the camera device 100m is mounted.

Figure 1B:
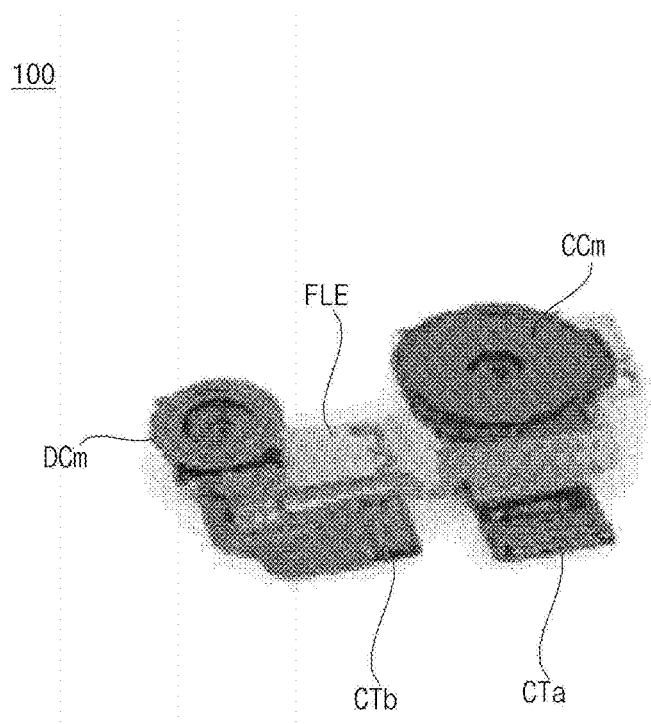
FIG. 1B is a diagram illustrating the appearance of a camera device according to an embodiment of the present disclosure.

FIG. 1B is a diagram illustrating the appearance of a camera device according to an embodiment of the present disclosure.

Referring to the drawing, an example is illustrated in which a camera device 100 includes a color camera CCm, an IR camera DCm, a connection member FLE for connecting the color camera CCm and the IR camera DCm, an interface CTa of the color camera CCm, and an interface CTb of the IR camera DCm.

Meanwhile, the connection member FLE for connecting the color camera CCm and the IR camera DCm may be flexible. That is, unlike FIG. 1A, the bracket BRK may not be provided. Accordingly, having no bracket, the camera device 100 or the electronic apparatus in which the camera device 100 is mounted may have an improved degree of freedom of design.

Meanwhile, in the camera device 100 of FIG. 1B, a distance between the color camera CCm and the IR camera DCm and the like may change irregularly, in which case calibration is required between a color image and an IR image. The calibration between the color image and the IR image will be described with reference to FIG. 6 and the following figures.

Meanwhile, the camera device 100 according to the embodiment of FIG. 1B of the present disclosure may be provided in various electronic apparatuses.

Figure 2:
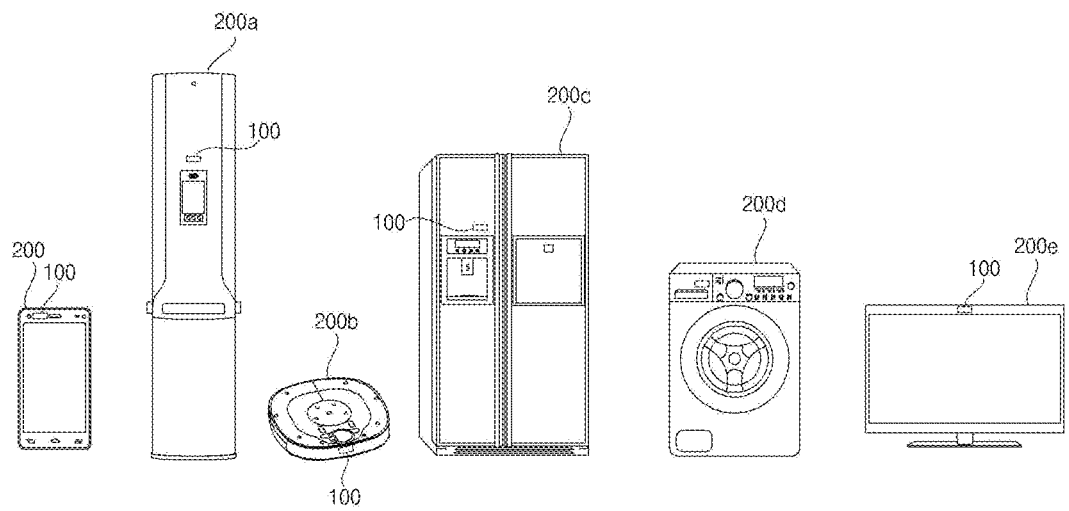
FIG. 2 is a diagram explaining various examples of an electronic apparatus.

FIG. 2 is a diagram explaining various examples of an electronic apparatus.

Referring to FIG. 2, the camera device 100 according to the embodiment of FIG. 1B of the present disclosure may be employed in a mobile terminal 200, an air conditioner 200a, a robot cleaner 200b, a refrigerator 200c, a washing machine 200d, a TV 200e, a vehicle, a drone, and the like.

The following description will be made based on the camera device 100 provided in the mobile terminal 200.

Figure 3A:
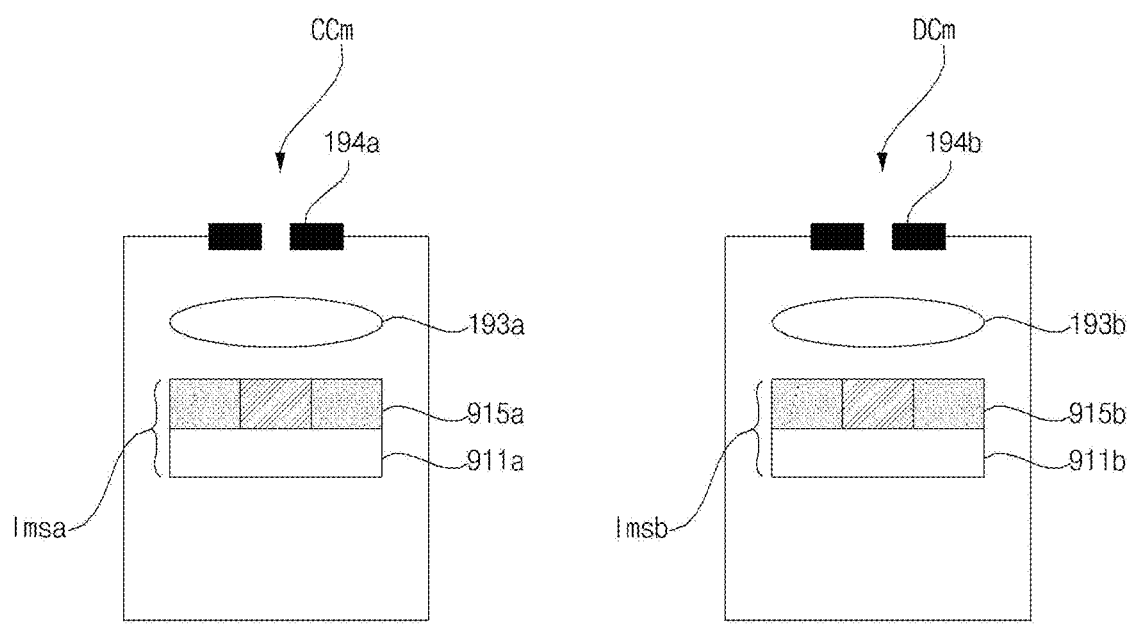
FIG. 3A is an internal cross-sectional view of a color camera and an IR camera of FIG. 1B.

FIG. 3A is an internal cross-sectional view of a color camera and an IR camera of FIG. 1B.

Referring to the drawing, the color camera CCm may include an aperture 194a, a lens device 193a, and an image sensor Imsa.

The aperture 194a may permit or prevent light incident upon the lens device 193a.

The lens device 193a may include a plurality of lenses which are adjusted for focus variation.

For sensing RGB colors, the image sensor Imsa may include a RGb filter 915a, and a sensor array 911a for converting an optical signal into an electrical signal.

Accordingly, the image sensor Imsa may sense and output a color image.

The IR camera DCm may include an aperture 194b, a lens device 193b, and an image sensor Imsb.

The aperture 194b may permit or prevent light incident upon the lens device 193b.

The lens device 193b may include a plurality of lenses which are adjusted for focus variation.

For sensing an IR image, the image sensor Imsb may include an IR filter 915b, and a sensor array 911a for converting an optical signal into an electrical signal.

Accordingly, the image sensor Imsb may sense and output an IR image.

Meanwhile, in addition to the color image, the color camera CCm may output images of various colors. For example, the color camera CCm may output a W color image, RGBY images, or the like.

Figure 3B:
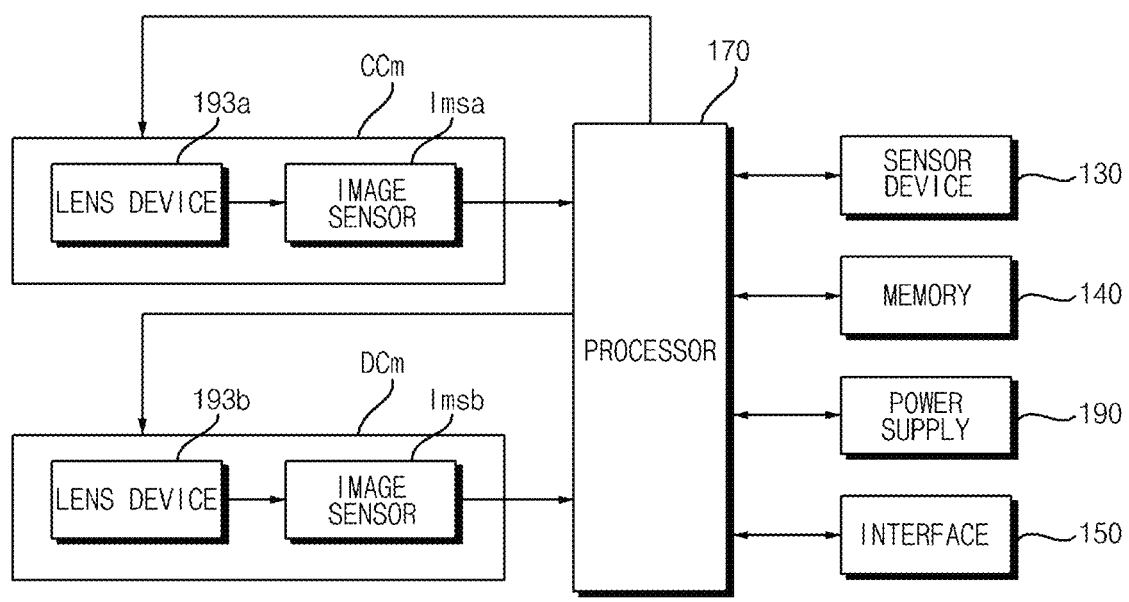
FIG. 3B is an internal block diagram of a camera device including the color camera and the IR camera of FIG. 1B.

FIG. 3B is an internal block diagram of a camera device including the color camera and the IR camera of FIG. 1B.

Referring to the drawing, the camera device 100 may include the color camera CCm, the IR camera DCm, a processor 170, a sensor device 130, a memory 140, a power supply 190, and an interface 150.

For outputting a color image, the color camera CCm may include the lens device 193a and the image sensor Imsa.

The lens device 193a in the color camera CCm may include a plurality of lenses which receive the incident light and are adjusted for focus variation.

Meanwhile, an exposure time of the image sensor Imsa may be adjusted based on an electronic signal.

For outputting an IR image, the IR camera DCm may include the lens device 193b and the image sensor Imsb.

The lens device 193b in the IR camera DCm may include a plurality of lenses which receive the incident light and are adjusted for focus variation.

Meanwhile, the processor 170 may receive the color image which is based on the electronic signal from the image sensor Imsa in the color camera CCm. Alternatively, the processor 170 may generate a color image based on the electronic signal from the image sensor Imsa in the color camera CCm.

Meanwhile, the processor 170 may receive the IR image which is based on the electronic signal from the image sensor Imsb in the IR camera DCm. Alternatively, the processor 170 may generate an IR image based on the electronic signal from the image sensor Imsb in the IR camera DCm.

Meanwhile, the processor 170 may calculate error information based on a difference between the color image, obtained from the color camera CCm, and the IR image from the IR camera DCm, and may compensate for at least one of the color image and the IR image based on the calculated error information and may output the compensated color image or the compensated IR image.

Meanwhile, by analyzing each feature point of the color image from the color camera CCm and the IR image from the IR camera, the processor 170 may calculate three-dimensional (3D) error information, and may compensate for at least one of the color image and the IR image based on the calculated 3D error information, to output the compensated color image or the compensated IR image.

Meanwhile, the processor 170 may upscale the IR image, may calculate 3D error information between the upscaled IR image and the color image, and may compensate for at least one of the color image and the IR image based on the calculated 3D error information, to output the compensated color image or the compensated IR image.

Meanwhile, by matching the compensated and upscaled IR image with the color image based on the calculated 3D error information, the processor 170 may output the compensated color image.

Meanwhile, by comparing a luminance component of a color image Imgr with a luminance component of the IR image Imgt, the processor 170 may calculate error information, and may compensate for at least one of the color image and the IR image based on the calculated error information to output the compensated color image or the compensated IR image.

The sensor device 130 may sense movement information, position information, or the like of the camera device 100. To this end, the sensor device 130 may include a GPS receiving unit, an inertial sensor (gyro sensor, acceleration sensor, etc.), and the like.

The memory 140 may store data for operation of the camera device 100 or the color image from the color camera CCm, the IR image from the IR camera DCm, or the compensated color image or the compensated IR image.

The interface 150 may be used for data transmission with other units of the camera device 100.

The power supply 190 may supply power for operation of the camera device 100.

For example, the power supply 190 may convert DC power or AC power input from an external source and may supply the converted DC power to the processor 170, the color camera CCm, the IR camera DCm, the sensor device 130, the memory 140, the interface 150, and the like.

FIGS. 4A to 5C are diagrams referred to in the description of an operation of the camera device of FIG. 3B.

Figure 4A:
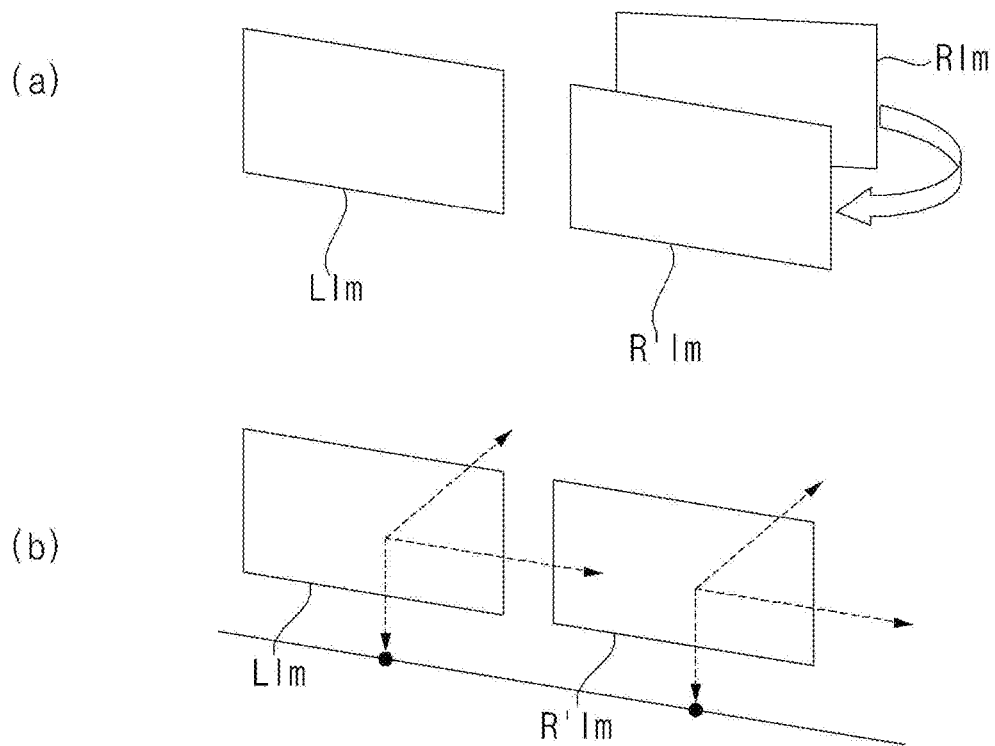

First, (a) of FIG. 4A illustrates an example of calibrating an IR image Rim due to a distortion between a color image Lim obtained from the color camera CCm and an IR image Rim obtained from the IR camera DCm. Specifically, (a) of FIG. 4A illustrates an IR image R'im obtained by compensating for the IR image Rim.

The compensated IR image Rim may be an image which is compensated based on at least one of 3D translation, 3D shift, and 3D rotation.

Here, the 3D rotation may include yaw, pitch, and roll rotations.

Then, (b) of FIG. 4A illustrates the color image Lim and the compensated IR image R'im which are aligned regularly. Accordingly, by matching the color image Lim with the compensated IR image R'im, the compensated color image or the compensated IR image may be output.

Figure 4B:
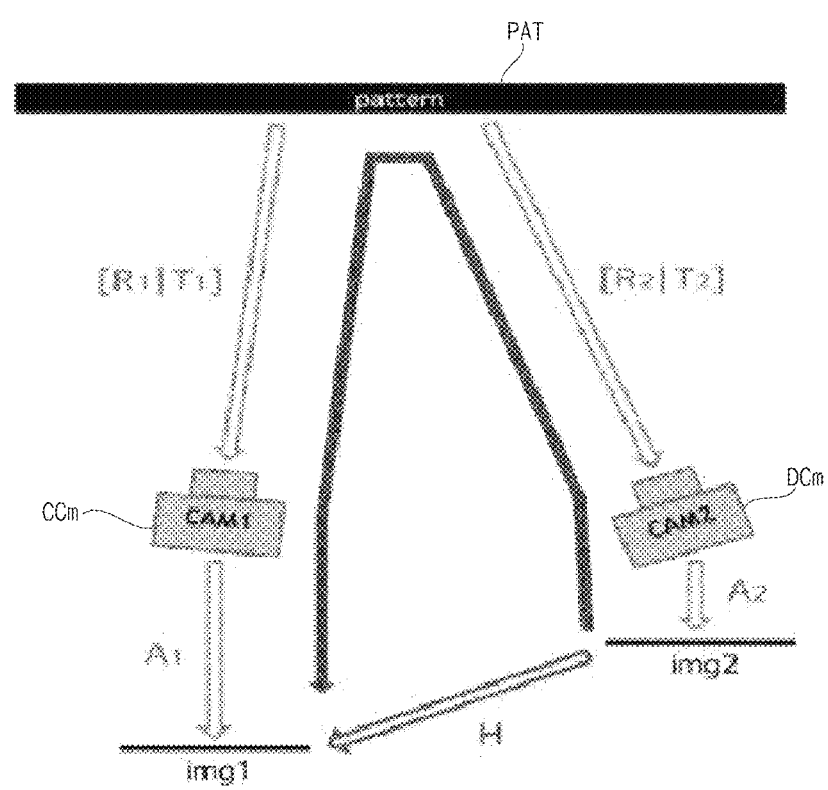

FIG. 4B illustrates an example of photographing the same pattern PAT by using the color camera CCm and the IR camera DCm.

A misalignment, such as [R1, T1., occurs due to the 3D rotation, 3D translation, and the like of the color camera CCm, such that a color image img1 is obtained from the color camera CCm.

Then, a misalignment, such as [R2, T2., occurs due to the 3D rotation, 3D translation, and the like of the IR camera DCm, such that an IR image img2 is obtained from the IR camera DCm.

Meanwhile, a difference between the color image img1 and the IR image img2 may be represented by a degree of distortion H.

Meanwhile, in order to minimize a difference between the color image img1 and the IR image img2, the processor 170 may calculate a degree of distortion H, which is a difference between the color image img1 and the IR image img2, misalignment information [R1, T1., such as rotation, translation, and the like of the color image img1, and misalignment information [R2, T2., such as rotation, translation, and the like of the IR image img2.

Further, based on the degree of distortion H, the misalignment information [R1, T1., such as rotation, translation, and the like of the color image img1, and the misalignment information [R2, T2., such as rotation, translation, and the like of the IR image img2, the processor 170 may output the compensated color image or the compensated IR image for reducing an error.

FIG. 5A illustrates a color image 510 obtained from the color camera CCm and an IR image 515 obtained from the IR camera DCm in the camera device 100.

If there is a difference in resolution between the color camera CCm and the IR camera DCm, a resolution of the color image 510 may be higher than a resolution of the IR image 515.

First, in order to perform calibration based on the difference between the color image 510 and the IR image 515, it is required to adjust the resolution of the color image 510 to be the same as the resolution of the IR image 515.

To this end, the processor 170 may upscale the IR image.

Alternatively, the processor 170 may upscale the IR image and may downscale the color image.

FIG. 5B illustrates a downscaled color image 520 and an upscaled IR image 525.

Meanwhile, when upscaling a low-resolution IR image, a blur and the like may occur according to a pattern included in the IR image.

Figure 5C:
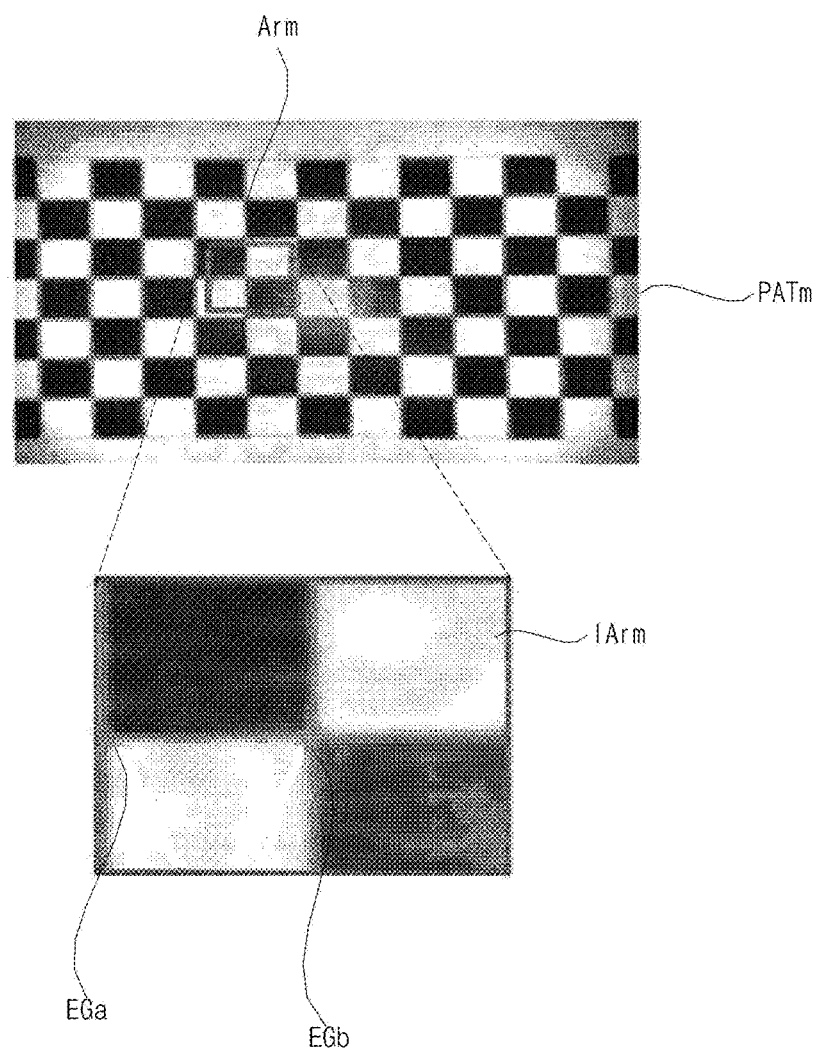

FIG. 5C illustrates an IR image IArm captured of an area Arm in a black-and-white square grid pattern.

In the IR image IArm, a blur may occur in boundaries EGa and EGb between black and white areas, and this phenomenon is more noticeable when the IR image is upscaled.

Figure 7:
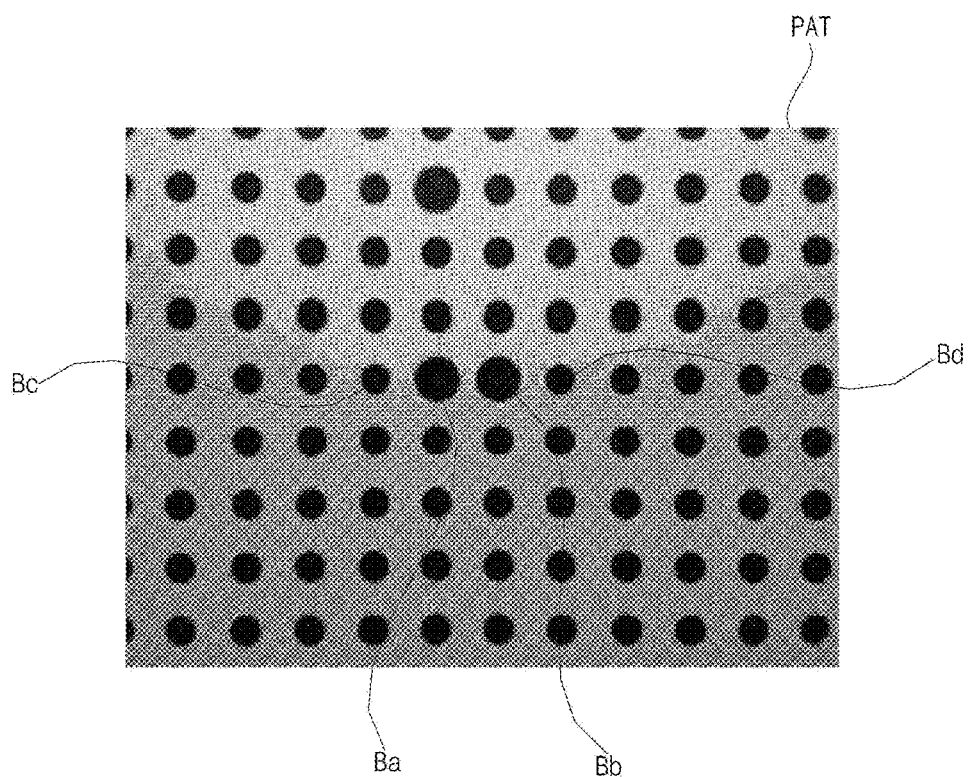
FIGS. 7 to 10F are diagrams referred to in the description of the operating method of FIG. 6.

Accordingly, a pattern used for calibration of the color camera CCm and the IR camera DCm is preferably a circular grid pattern as illustrated in FIG. 7, rather than a square grid pattern. Meanwhile, in order to determine a reference point and the like, a grid pattern of circles of a plurality of sizes may be preferable.

Figure 6:
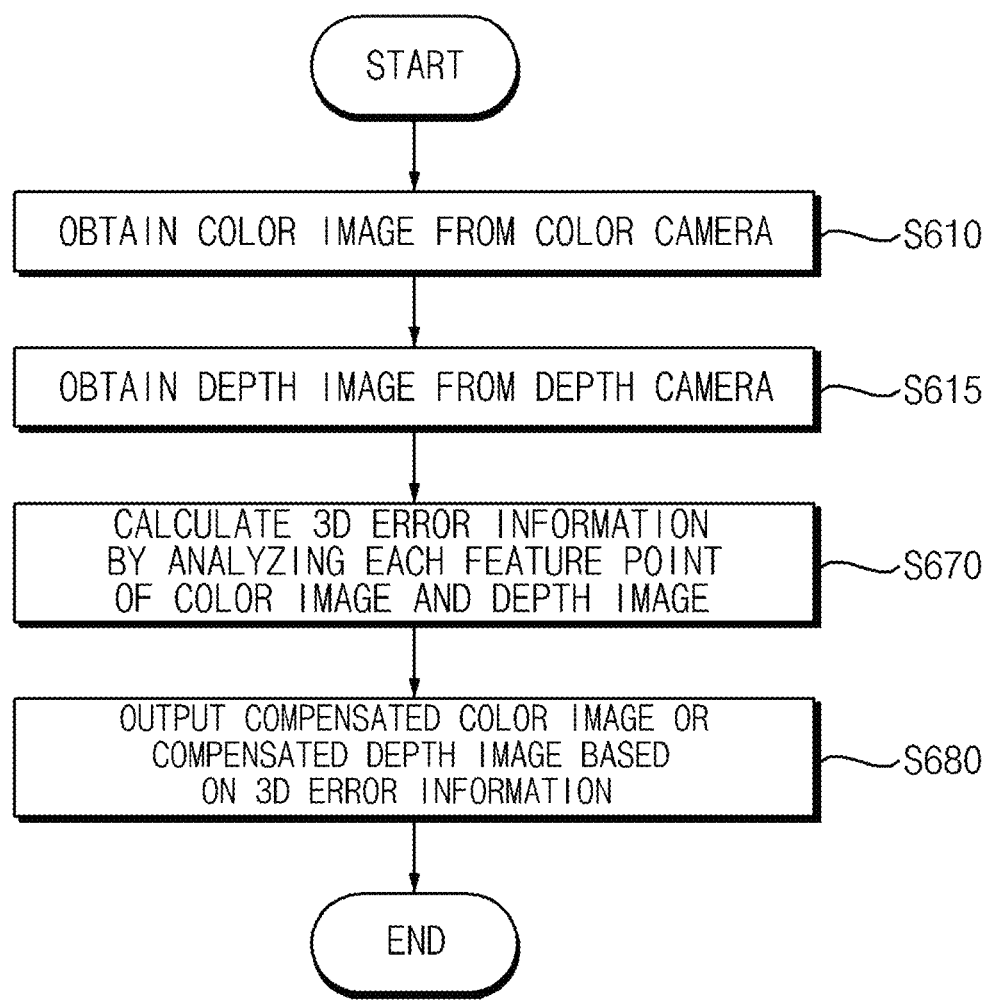
FIG. 6 is a flowchart illustrating an operating method of a camera device.

FIG. 6 is a flowchart illustrating an operating method of a camera device, and FIGS. 7 to 10F are diagrams referred to in the description of the operating method of FIG. 6.

First, referring to FIG. 6, the processor 170 in the camera device 100 obtains a color image from the color camera CCm (S610).

Then, the processor 170 in the camera device 100 obtains an IR image from the IR camera DCm (S615).

The obtained color image and IR image may be images captured of the same pattern or object.

For example, a color image and an IR image captured of a grid pattern PAT of circles of a plurality of sizes as illustrated in FIG. 7 may be obtained at a first time point.

In the grid pattern PAT of circles of a plurality of sizes illustrated in FIG. 7, circular patterns Ba and Bb of a first size are disposed at the center thereof, and circular patterns Bc and Bd of a second size are disposed around the circular patterns Ba and Bb of the first size.

In this case, the circular patterns may be in black or in colors, and a background color around the circular patterns may be white.

Figure 8A:
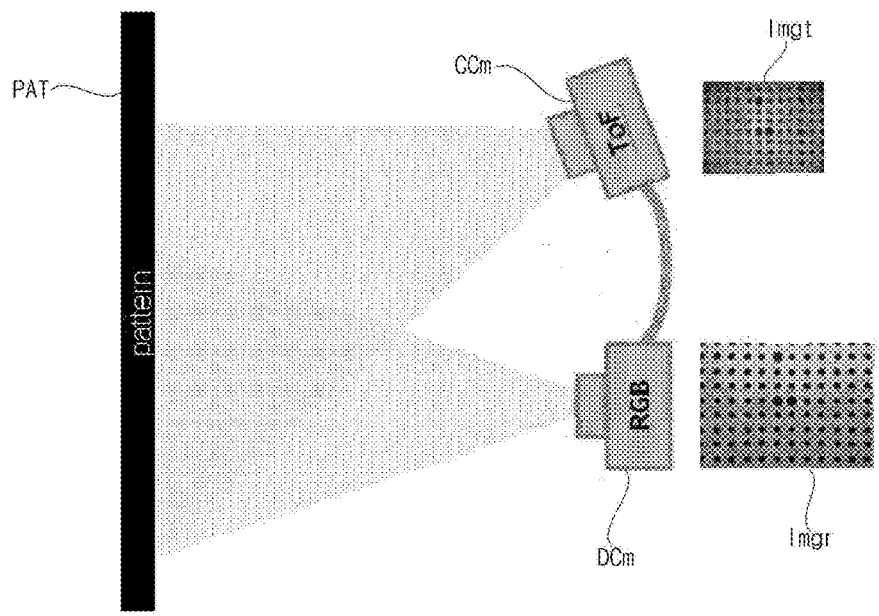
Figure 8B:
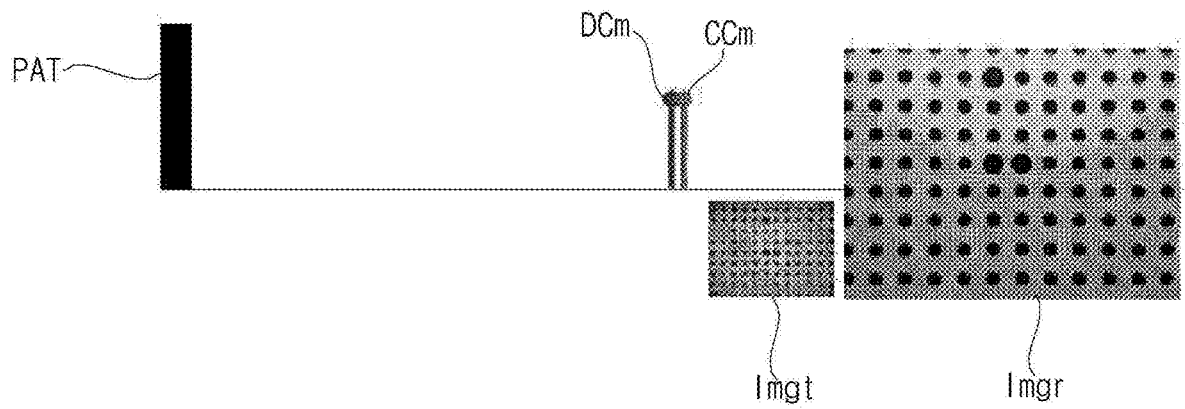

FIG. 8A illustrates a top view of the color camera CCm and the IR camera DCm capturing an image of the grid pattern PAT of circles of a plurality of sizes, and FIG. 8B illustrates a side view of the color camera CCm and the IR camera DCm capturing an image of the grid pattern PAT of circles of a plurality of sizes.

Referring to FIGS. 8A and 8B, the color camera CCm and the IR camera DCm are spaced apart from each other by a predetermined distance, in which the color camera CCm may acquire a color image Imgr, and the IR camera DCm may acquire an IR image Imgt, of the grid pattern PAT of circles of a plurality of sizes.

As described above, if there is a difference in resolution between the color camera CCm and the IR camera DCm, the processor 170 may perform upscaling and the like of the IR image Imgt.

Then, the processor 170 in the camera device 100 may calculate 3D error information by analyzing each feature point of the color image and the IR image (S670).

Subsequently, the processor 170 in the camera device 100 may output a compensated color image or a compensated IR image based on the calculated 3D error information (S680).

Meanwhile, the processor 170 may calculate error information based on the color image Imgr obtained from the color camera CCm and the IR image Imgt obtained from the IR camera DCm, and may compensate for at least one of the color image Imgr and the IR image Imgt based on the calculated error information to output the compensated color image or the compensated IR image. Accordingly, a difference between the color image Imgr from the color camera CCm and the IR image Imgt from the IR camera DCm may be compensated rapidly and accurately.

Meanwhile, by analyzing each feature point of the color image Imgr from the color camera CCm and the IR image Imgt from the IR camera DCm, the processor 170 may calculate 3D error information, and may compensate for at least one of the color image Imgr and the IR image Imgt based on the calculated 3D error information to output the compensated color image 540 or the compensated IR image Imgt. Particularly, based on the calculated 3D error information, the difference between the color image Imgr from the color camera CCm and the IR image Imgt from the IR camera DCm may be compensated rapidly and accurately.

Meanwhile, the processor 170 may upscale the IR image Imgt, may calculate 3D error information between the upscaled IR image Imgt and the color image Imgr, and may compensate for at least one of the color image Imgr and the IR image Imgt based on the calculated 3D error information to output the compensated color image or the compensated IR image. Accordingly, the difference between the color image Imgr from the color camera CCm and the IR image Imgt from the IR camera DCm may be compensated rapidly and accurately.

Meanwhile, the 3D error information may include relative rotation information, relative translation information, or relative shift information between the color image Imgr and the IR image Imgt. Accordingly, based on the relative rotation information, relative translation information, or relative shift information, the difference between the color image Imgr from the color camera CCm and the IR image Imgt from the IR camera DCm may be compensated rapidly and accurately.

Meanwhile, by matching the compensated and upscaled IR image Imgt with the color image Imgr based on the calculated 3D error information, the processor 170 may output a compensated color image. Accordingly, the difference between the color image Imgr from the color camera CCm and the IR image Imgt from the IR camera DCm may be compensated rapidly and accurately.

Meanwhile, by comparing a luminance component of the color image Imgr with a luminance component of the IR image Imgt, the processor 170 may calculate error information, and may compensate for at least one of the color image Imgr and the IR image Imgt based on the calculated error information to output the compensated color image or the compensated IR image. Accordingly, the difference between the color image Imgr from the color camera CCm and the IR image Imgt from the IR camera DCm may be compensated rapidly and accurately.

Figure 9:
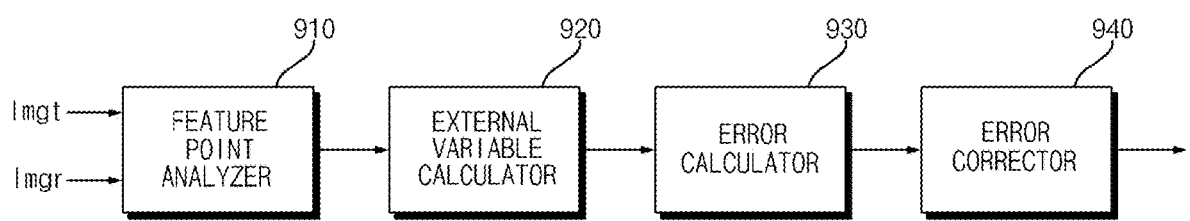

FIG. 9 illustrates an example of an internal block diagram of the processor 170.

Referring to the drawing, the processor 170 may include: a feature point analyzer 910 configured to analyze each feature point of the color image Imgr from the color camera CCm and the IR image Imgt from the IR camera DCm; an external variable calculator 920 configured to calculate an external variable based on each feature point information analyzed by the feature point analyzer 910; an error calculator 930 configured to calculate 3D error information based on the calculated external variable; and an error corrector 940 configured to correct an error based on the 3D error information. Accordingly, the difference between the color image Imgr from the color camera CCm and the IR image Imgt from the IR camera DCm may be compensated rapidly and accurately.

Figure 10A:
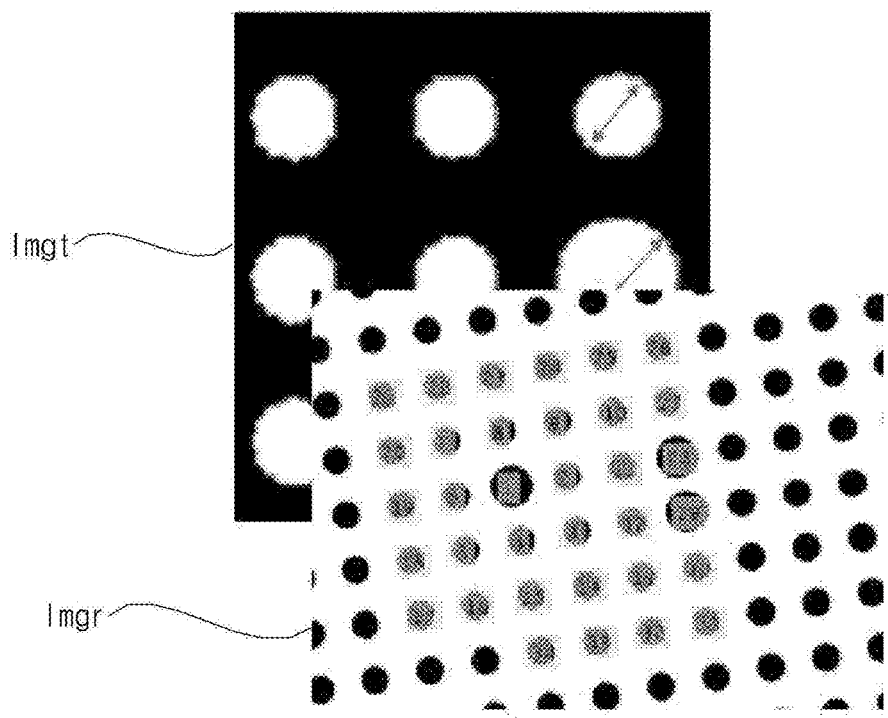

FIG. 10A illustrates the color image Imgr from the color camera CCm and the IR image Imgt from the IR camera DCm, which are input to the feature point analyzer 910.

Meanwhile, the feature point analyzer 910 may detect a pattern or a reference point from each of the color image Imgr from the color camera CCm and the IR image Imgt from the IR camera DCm, and may calculate a direction vector based on the detected pattern or reference point.

Meanwhile, the feature point analyzer 910 may detect a circular pattern from the color image Imgr and the IR image Imgt, and may detect a reference point in the circular pattern.

Meanwhile, the feature point analyzer 910 may calculate a direction vector based on the detected circular pattern or reference point.

Further, the feature point analyzer 910 may analyze the feature point based on the detected circular pattern or reference point, or the direction vector. That is, the feature point may include the circular pattern, the reference point, or the direction vector.

Meanwhile, based on each feature point information analyzed by the feature point analyzer 910, the external variable calculator 920 may calculate rotation information, translation information, or shift information of each of the color image Imgr and the IR image Imgt.

Meanwhile, the external variable calculator 920 may calculate a homography between the color image Imgr and the IR image Imgt.

Meanwhile, based on the calculated homography, the external variable calculator 920 may calculate the rotation information, the translation information, or the shift information of each of the color image Imgr and the IR image Imgt.

Meanwhile, based on the rotation information, the translation information, or the shift information of each of the color image Imgr and the IR image Imgt, the error calculator 930 may calculate relative rotation information, relative translation information, or relative shift information between the color image Imgr and the IR image Imgt.

Meanwhile, the error calculator 930 may calculate a reprojection error based on the color image Imgr and the IR image Imgt.

Figure 10B:
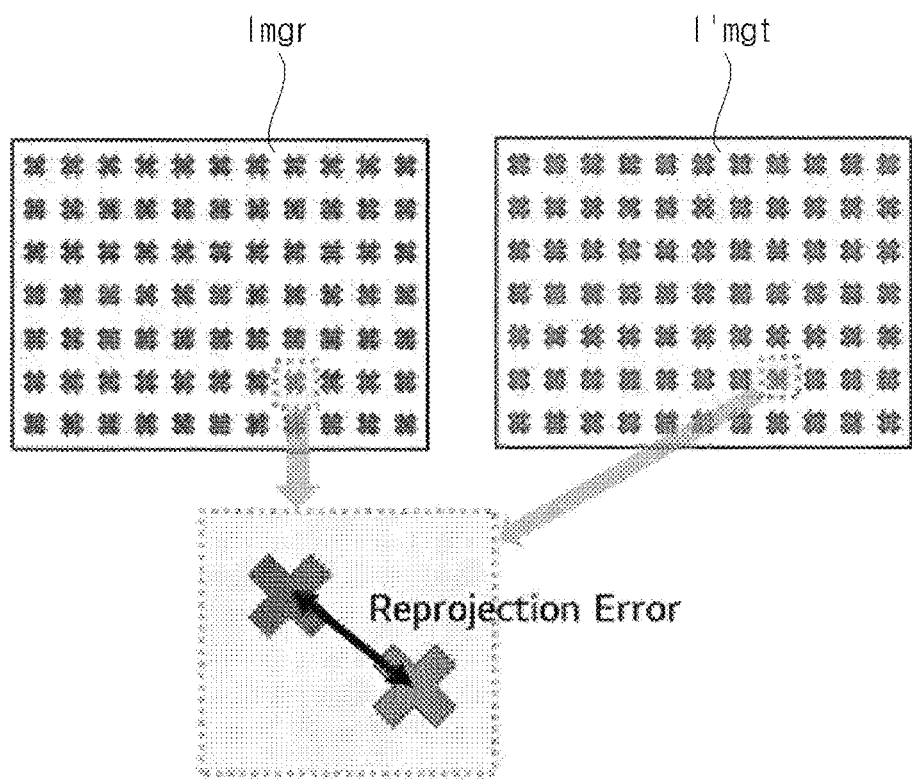

FIG. 10B illustrates an example of calculating a reprojection error based on the color image Imgr and a compensated IR image I'mgt.

The reprojection error information may include the above relative rotation information, relative translation information, or relative shift information.

Meanwhile, by matching the compensated and upscaled IR image Imgt with the color image Imgr based on the calculated 3D error information, the error corrector 940 may output a compensated color image. Accordingly, the difference between the color image Imgr from the color camera CCm and the IR image Imgt from the IR camera DCm may be compensated rapidly and accurately.

Meanwhile, the error corrector 940 may output the compensated color image or the compensated IR image based on the calculated 3D error information.

Figure 10C:
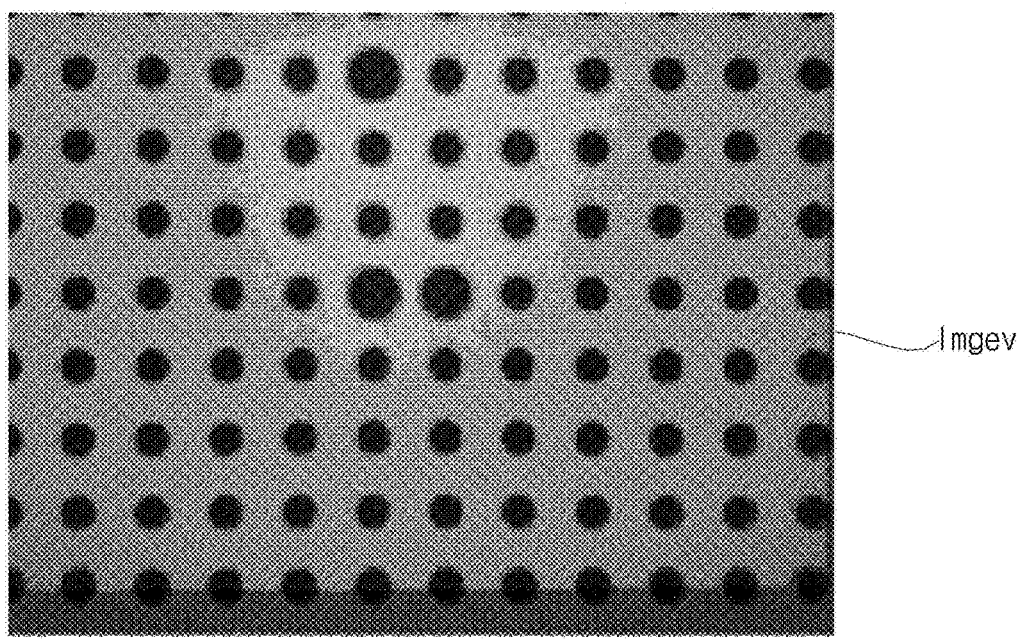

FIG. 10C illustrates an example of a compensated IR image Imgev.

Accordingly, the difference between the color image Imgr from the color camera CCm and the IR image Imgt from the IR camera DCm may be compensated rapidly and accurately.

FIG. 10D illustrates an example of another color image and another IR image.

Referring to the drawing, the processor 170 may receive a color image 510 from the color camera CCm of the camera device 100 and an IR image 515 from the IR camera DCm.

If there is a difference in resolution between the color camera CCm and the IR camera DCm, a resolution of the color image 510 may be higher than a resolution of the IR image 515, as illustrated in the drawing.

Accordingly, the processor 170 may downscale the color image 510 and may upscale the IR image 515.

Figure 10E:
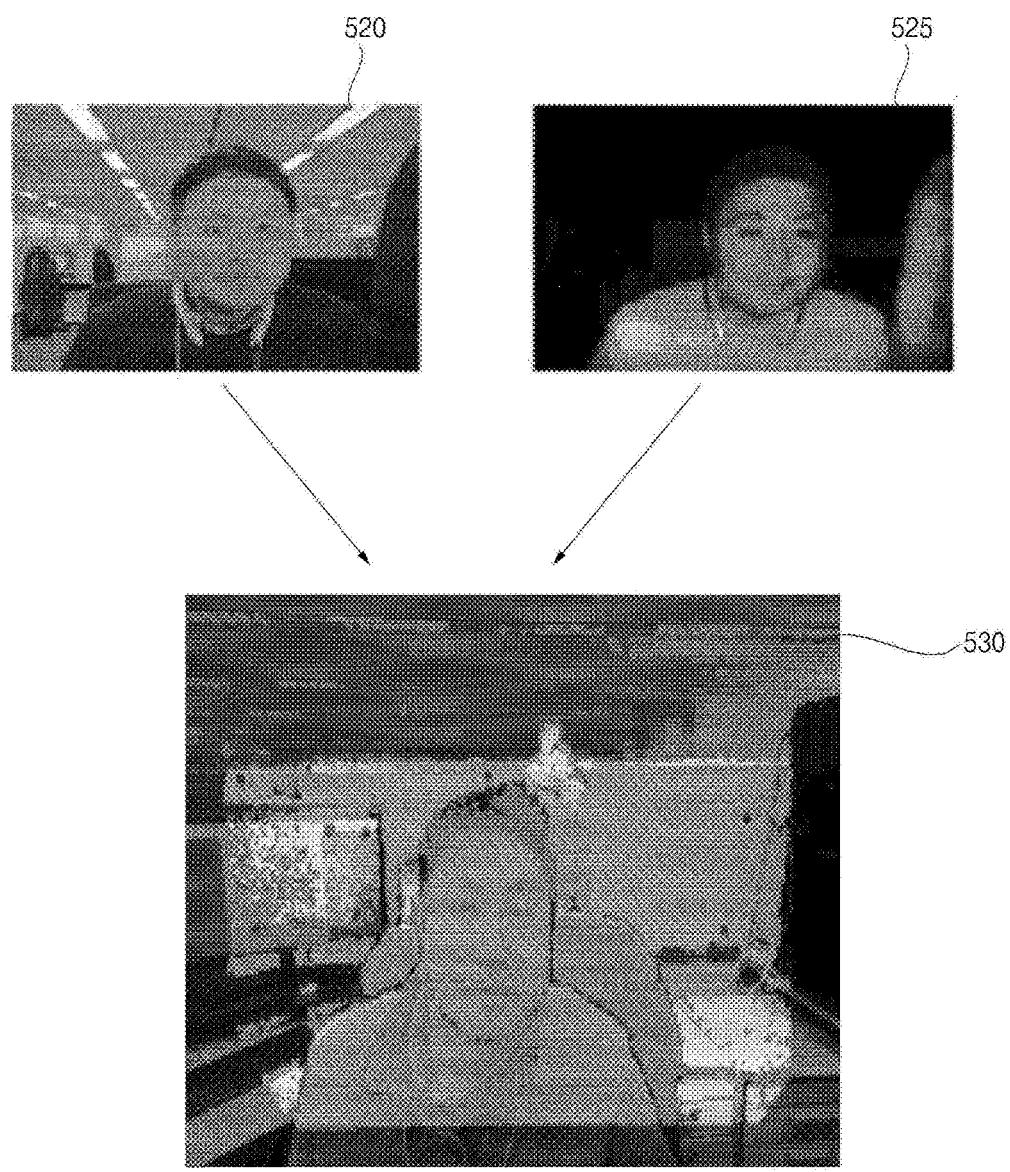

FIG. 10E illustrates a downscaled color image 520 and an upscaled IR image 525.

Meanwhile, the processor 170 may perform matching by using the downscaled color image 520 and the upscaled IR image 525.

For example, the processor 170 may match the upscaled IR image 525 to the downscaled color image 520. Further, the processor 170 may calculate error information based on the difference.

For example, by analyzing each feature point based on the downscaled color image 520 and the upscaled IR image 525, the processor 170 may calculate 3D error information.

Specifically, by analyzing each feature point based on the downscaled color image 520 and the upscaled IR image 525, the processor 170 may calculate 3D error information, such as the relative rotation information, relative translation information, or relative shift information, between the color image Imgr and the IR image Imgt.

In addition, the processor 150 may output the compensated color image or the compensated IR image based on the calculated 3D error information.

Figure 10F:

FIG. 10F illustrates an example of a compensated color image 540. Unlike the drawing, a compensated IR image may also be output.

Accordingly, the difference between the color image from the color camera and the IR image from the IR camera may be compensated rapidly and accurately.

Meanwhile, various effects may be obtained by combining the color image from the color camera and the IR image from the IR camera.

The present disclosure provides a method of simply generating a bokeh image by combining the color image from the color camera and the IR image from the IR camera. Specifically, the present disclosure provides a method of generating a bokeh image having a clear foreground and a blurred background, which will be described with reference to FIG. 11 and the following figures.

FIG. 11 is a flowchart illustrating an operating method of a camera device according to an embodiment of the present disclosure, and FIGS. 12 to 16C are diagrams referred to in the description of the operating method of FIG. 11.

Referring to the drawing, the processor 170 in the camera device 100 obtains a color image from the color camera CCm (S1110).

The, the processor 170 in the camera device 100 obtains an IR image from the IR camera DCm (S1115).

The obtained color image and IR image may be images captured of the same pattern or object.

For example, a color image and an IR image captured of the grid pattern PAT of circles of a plurality of sizes as illustrated in FIG. 7 may be obtained at a first time point.

In another example, a color image and an IR image, which include a common face area, may be obtained as illustrated in FIG. 10D.

Then, the processor 170 in the camera device 100 may separate and refine a foreground region and a background region of the IR image from the IR camera DCm (S1120).

Subsequently, the processor 170 in the camera device 100 may filter the color image based on a refined foreground signal (S1125).

Next, the processor 170 in the camera device 100 may generate a foreground object mask based on the filtered color image (S1130).

Then, the processor 170 in the camera device 100 may generate a bokeh image for the color image based on the foreground object mask (S1130).

Meanwhile, the foreground region may include a face region, and in the bokeh image, the face region may be clearer than the background region. That is, the face region becomes clearer as the background region becomes blurred.

Accordingly, by using the IR image from the IR camera DCm, the bokeh image may be simply generated for the color image from the color camera CCm.

Meanwhile, by separating the foreground region and the background region from the IR image from the IR camera DCm, and by filtering the color image from the color camera CCm based on the separated foreground region, the processor 170 may generate a bokeh image for the color image. Accordingly, by using the IR image from the IR camera DCm, a bokeh image for the color image from the color camera CCm may be simply generated.

Meanwhile, the processor 170 may generate a foreground object mask based on the filtered color image, and may generate a bokeh image for the color image based on the foreground object mask. Accordingly, by using the IR image from the IR camera DCm, a bokeh image for the color image from the color camera CCm may be simply generated.

Meanwhile, the processor 170 may downscale the color image from the color camera CCm, and may filter the downscaled color image based on the foreground region separated from the IR image. Accordingly, by using the IR image from the IR camera DCm, a bokeh image for the color image from the color camera CCm may be simply generated.

Meanwhile, the processor 170 may downscale the color image from the color camera CCm, may upscale the filtered and downscaled color image, and may filter the downscaled color image based on the upscaled color image. Accordingly, by using the IR image from the IR camera DCm, a bokeh image for the color image from the color camera CCm may be simply generated.

Meanwhile, the processor 170 may generate a foreground object mask based on the filtered and downscaled color image. Accordingly, by using the IR image from the IR camera DCm, a bokeh image for the color image from the color camera CCm may be simply generated.

Meanwhile, the processor 170 may downscale the color image from the color camera CCm, may filter the downscaled color image based on the foreground object mask, may upscale the filtered color image and the foreground object mask, and may generate a bokeh image by synthesizing the upscaled color image and the upscaled foreground object mask. Accordingly, by using the IR image from the IR camera DCm, a bokeh image for the color image from the color camera CCm may be simply generated.

Figure 12:
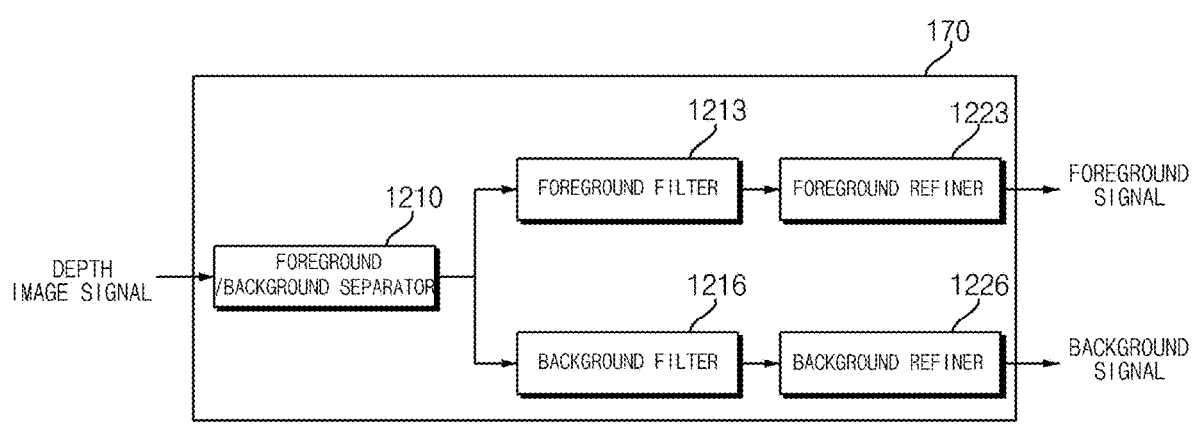
FIGS. 12 to 16C are diagrams referred to in the description of the operating method of FIG. 11.

FIG. 12 is a diagram illustrating an example of performing signal processing by separating the foreground and the background from the IR image.

Referring to the drawing, the processor 170 may include: a foreground/background separator 1210 configured to separate a foreground region and a background region from the IR image from the IR camera DCm; a foreground filter 1213 configured to filter the foreground region; a foreground refiner 1223 configured to refine the filtered foreground region; a background filter 1216 configured to filter the background region; and a background refiner 1226 configured to refine the filtered background region.

Accordingly, the processor 170 may output the foreground and background regions which are separated from the IR image from the IR camera DCm and are refined.

Meanwhile, in order to remove a noise signal from the separated foreground and background regions, the foreground filter 1213 and the background filter 1215 may perform median filtering for removing a noise signal from a background signal.

Meanwhile, the foreground refiner 1223 and the background refiner 1226 may refine a boundary signal by filling a hole region of the separated foreground and background regions.

Figure 13A:
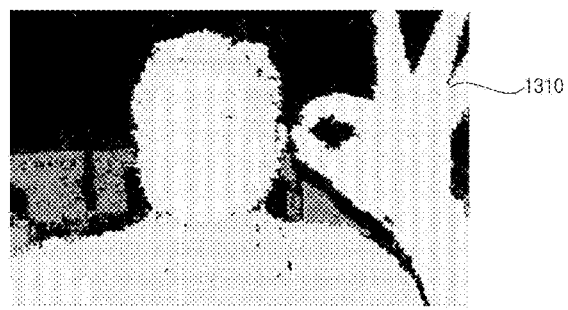

FIG. 13A illustrates an IR image 1310 which is input to the foreground/background separator 1210 of FIG. 12.

Figure 13B:
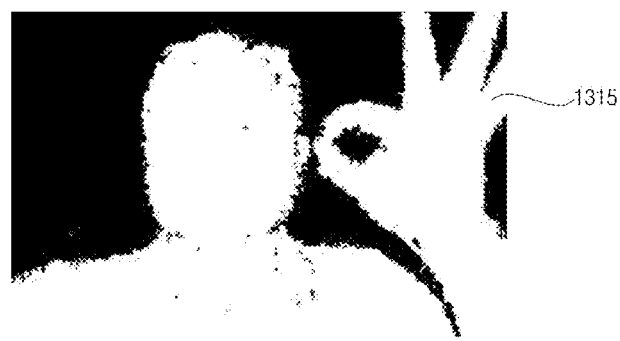

FIG. 13B illustrates a foreground region 1315 separated by the foreground/background separator 1210.

Figure 13C:

FIG. 13C illustrates a foreground region 1320 filtered by the foreground filter 1213.

Figure 13D:

FIG. 13D illustrates a foreground region 1325 in which a boundary region is refined by the foreground refiner 1223.

Referring to FIGS. 13A to FIG. 13D, the foreground region 1325, from which noise is removed, may be extracted according to operations of the foreground/background separator 1210, the foreground filter 1213, the foreground refiner 1223, and the like.

Figure 14A:
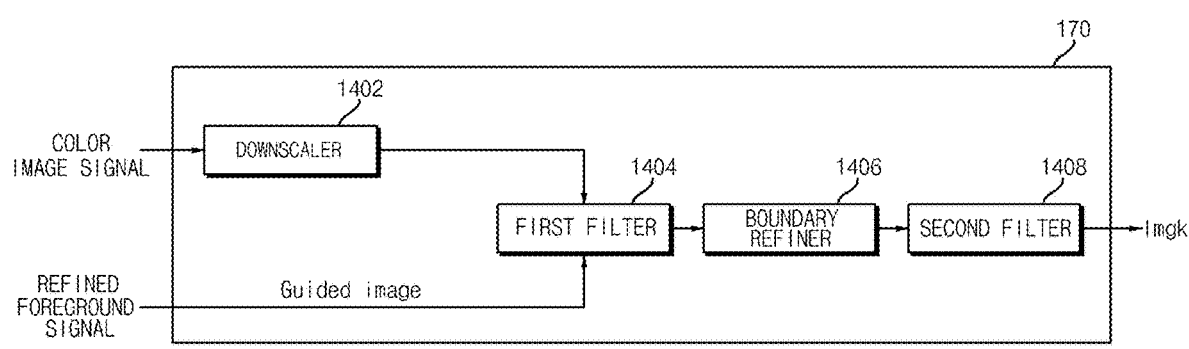
Figure 14B:
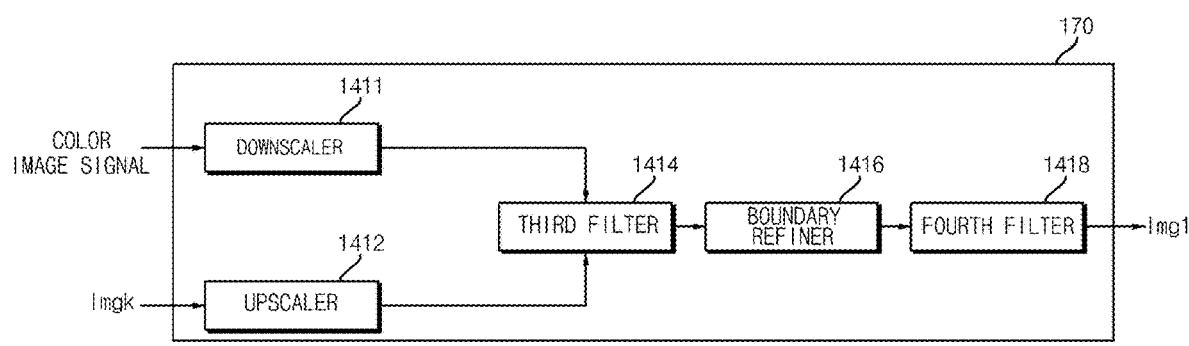
Figure 14C:
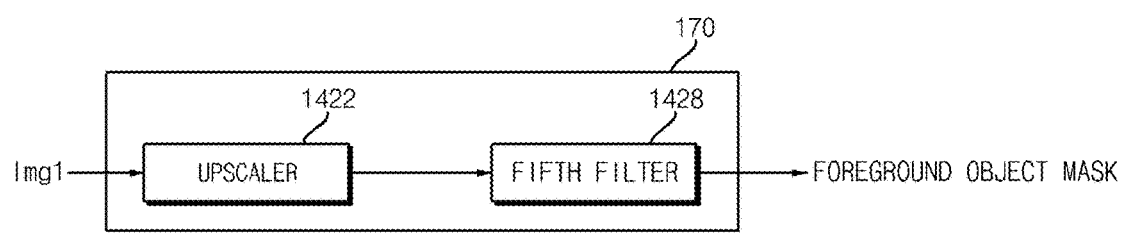

FIGS. 14A to 14C are diagrams referred to for generating a foreground object mask.

First, referring to FIG. 14A, the processor 170 may include: a downscaler 1402 configured to downscale the color image from the color camera CCm; a first filter 1404 configured to filter the downscaled color image based on the foreground region separated from the IR image; a boundary refiner 1406 configured to refine a boundary signal of the color image from the first filter 1404; and a second filter 1406 configured to filter the signal from the boundary refiner 1406.

The downscaler 1402 may downscale the color image from the color camera CCm in order to compensate for a difference in resolution between the color image and the IR image.

Then, the first filter 1404 may perform guided filtering based on the foreground region from the foreground refiner 1223 and the downscaled color image from the downscaler 1402.

Further, the boundary refiner 1406 may refine a boundary signal of the color image from the first filter 1404, and the second filter 1406 may filter the signal from the boundary refiner 1406.

In this case, the second filter 1406 performs median filtering for removing an unnecessary noise signal, and may output a filtered signal Imgk. In this case, the filtered signal Imgk may correspond to the foreground region.

Next, referring to FIG. 14B, the processor 170 may further include: a second downscaler 1411 configured to downscale the color image from the color camera CCm; an upscaler 1412 configured to upscale the signal Imgk from the second filter 1406; a third filter 1414 configured to filter the downscaled color image based on the signal from the upscaler 1412; a second boundary refiner 1416 configured to refine a boundary signal of the color image from the third filter 1414; and a fourth filter 1418 configured to filter the signal from the second boundary refiner 1416.

The second downscaler 1411 may downscale the color image from the color camera CCm in order to compensate for a difference in resolution between the color image and the IR image.

The upscaler 1412 may upscale the signal Imgk from the second filter 1406. Particularly, the upscaler 1412 may upscale the foreground region for comparison with the color image.

Then, the third filter 1414 may perform guided filtering based on the foreground region from the upscaler 1412 and the color image downscaled by the second downscaler 1411.

Further, the second boundary refiner 1416 may refine a boundary signal of the color image from the third filter 1414, and the fourth filter 1418 may filter the signal from the second boundary refiner 1416.

In this case, unlike the third filter 1414, the fourth filter 1418 may perform median filtering for removing an unnecessary noise signal, and may output a filtered signal Img1. In this case, the filtered signal Img1 may correspond to the foreground region.

Subsequently, referring to FIG. 14C, the processor 170 may further include a second upscaler 1422 configured to upscale the downscaled color image from the fourth filter 1418; and a fifth filter 1428 configured to output a foreground object mask by filtering the signal from the second upscaler 1422.

The second upscaler 1422 may upscale the signal Img1 from the fourth filter 1418.

Next, the fifth filter 1428 may perform Gaussian filtering on the foreground region from the second upscaler 1422. Accordingly, the fifth filter 1428 may generate and output the foreground object mask.

Figure 15A:

FIG. 15A illustrates a color image 1510 obtained from the color camera CCm.

Figure 15B:
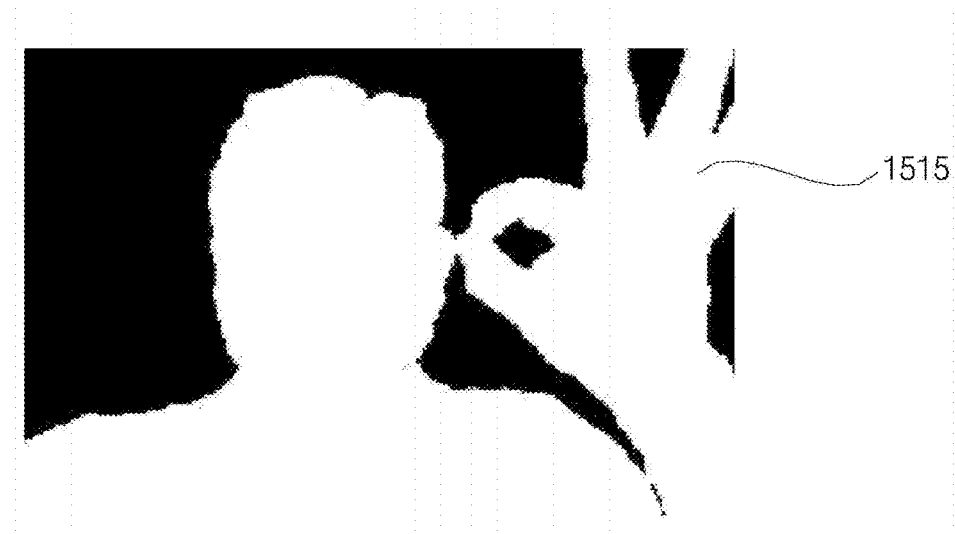

Then, FIG. 15B illustrates a foreground region 1515 in which a boundary region is refined by the foreground refiner 1223 of FIG. 12. Referring to FIG. 15B, the foreground region 1515, from which noise is removed, may be extracted according to operations of the foreground/background separator 1210, the foreground filter 1213, the foreground refiner 1223, and the like.

Meanwhile, for processing of a clearer foreground region and generating a foreground object mask, it is required to perform signal processing described with reference to FIGS. 14A to 14C.

Figure 15C:

FIG. 15C illustrates a foreground region 1520 filtered by the second filter 1408 of FIG. 14A.

Figure 15D:
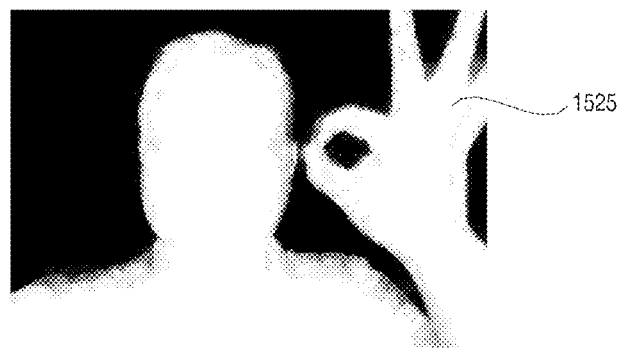

Then, FIG. 15D illustrates a foreground region 1525 filtered by the fourth filter 1418 of FIG. 14B.

Figure 15E:
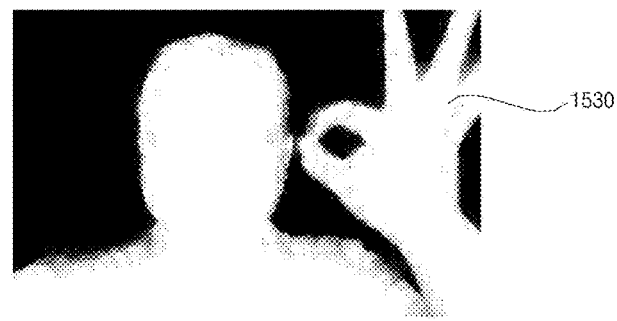

Next, FIG. 15E illustrates a foreground region 1530 filtered by the fifth filter 1428 of FIG. 14C.

It can be seen that the foreground region 1525 of FIG. 15D is clearer and more vivid compared to FIG. 15C, and the foreground region 1530 of FIG. 15E is clearer and more vivid compared to FIG. 15D.

Accordingly, a sharp foreground object mask 1530 may be generated and output as illustrated in FIG. 15E.

Figure 16A:
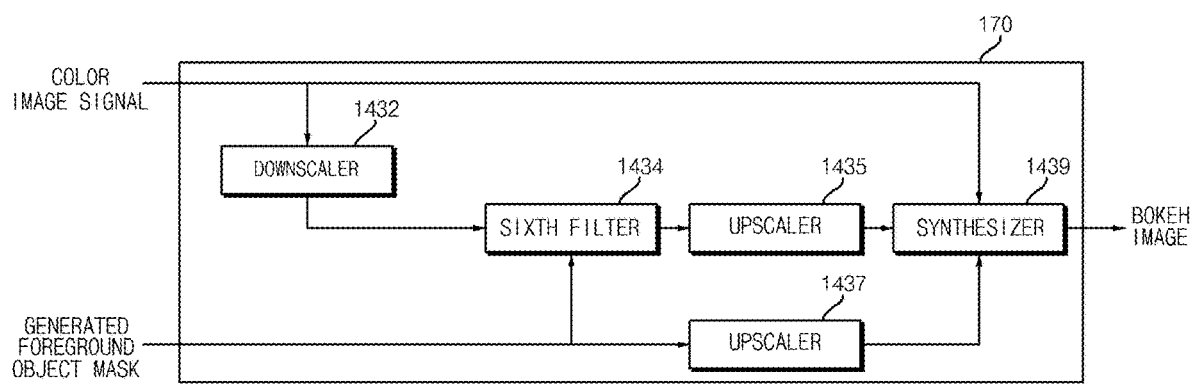

Meanwhile, referring to FIG. 16A, the processor 170 may include: a third downscaler 1432 configured to downscale the color image from the color camera CCm; a sixth filter 1434 configured to filter the color image from the third downscaler 1432 based on the foreground object mask; a third upscaler 1435 configured to upscale the color image from the sixth filter 1434; a fourth upscaler 1437 configured to upscale the foreground object mask; and a synthesizer 1439 configured to synthesize signals from the third upscaler 1435 and the fourth upscaler 1437 to output a bokeh image. Accordingly, a bokeh image for the color image from the color camera CCm may be simply generated by using the IR image from the IR camera DCm.

The third downscaler 1432 may downscale the color image from the color camera CCm in order to compensate for a difference in resolution between the color image and the IR image.

Figure 16B:

FIG. 16B illustrates the color image 1510 obtained from the color camera CCm. Particularly, FIG. 16B illustrates the color image 1510 having a foreground region Fra, including a face region, and a background region Bka.

Based on the color image from the third downscaler 1432 and the foreground object mask, the sixth filter 1434 may perform adaptive bilateral filtering on the color image from the third downscaler 1432.

Accordingly, the sixth filter 1434 may apply a bokeh effect to a region other than the foreground object mask. That is, a color image having a clear foreground region and a blurred background region may be output.

Then, the third upscaler 1435 may upscale the color image from the sixth filter 1434, and the fourth upscaler 1437 may upscale the foreground object mask.

Figure 16C:
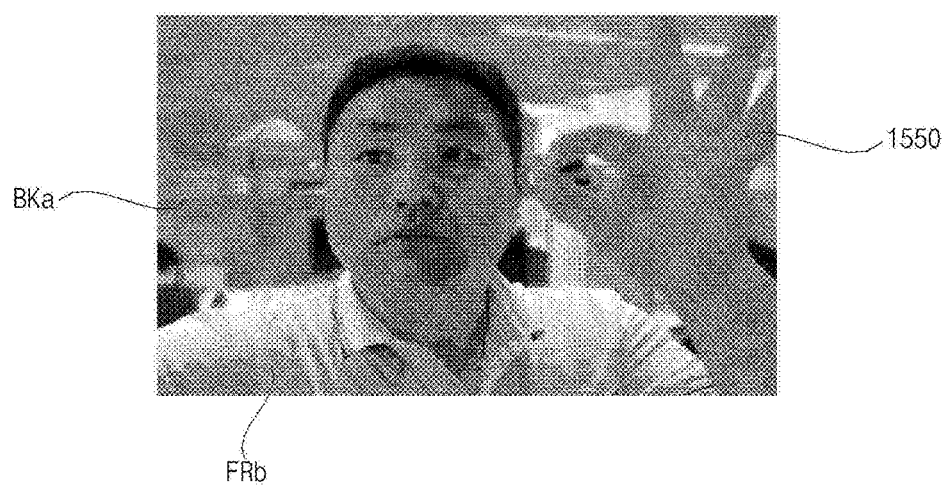

Further, the synthesizer 1439 may synthesize signals from the third upscaler 1435 and the fourth upscaler 1437, to output a bokeh image 1550 as illustrated in FIG. 16C. Accordingly, the color image having a clear foreground region Frb, including a face region, and a blurred background region Bkb may be output.

Accordingly, it is possible to simply and accurately generate the bokeh image 1550 in which the background region is out of focus, and the foreground region is in focus.

While the present disclosure has been particularly shown and described with reference to preferred embodiments thereof, it will be understood by those skilled in the art that the present disclosure is not limited to those exemplary embodiments and various changes in form and details may be made therein without departing from the scope and spirit of the invention as defined by the appended claims and should not be individually understood from the technical spirit or prospect of the present disclosure.

What is claimed is:

1. A camera device comprising:
   a color camera;
   an IR camera; and
   a processor configured to separate a foreground region and a background region of an IR image from the IR camera, filter a color image from the color camera based on the separated foreground or background region, and generate a bokeh image for the color image,
   wherein the processor comprises:
      a foreground/background separator configured to separate the foreground region and the background region of the IR image from the IR camera;
      a foreground filter configured to filter the foreground region;
      a foreground refiner configured to refine the filtered foreground region;
      a background filter configured to filter the background region; and
      a background refiner configured to refine the filtered background region.

2. The camera device of claim 1, wherein the processor is configured to separate the foreground region and the background region of the IR image from the IR camera, filter the color image from the color camera based on the separated foreground region, and generate the bokeh image for the color image.

3. The camera device of claim 1, wherein the processor is configured to generate a foreground object mask based on the filtered color image, and generate the bokeh image for the color image based on the foreground object mask.

4. The camera device of claim 1, wherein the foreground region comprises a face region, and
   wherein in the bokeh image, the face region is clearer than the background region.

5. The camera device of claim 1, wherein the processor comprises:
   a downscaler configured to downscale a color image from the color camera;
   a first filter configured to filter the downscaled color image based on the foreground region separated from the IR image;
   a boundary refiner configured to refine a boundary signal of the color image from the first filter; and
   a second filter configured to filter the signal from the boundary refiner.

6. The camera device of claim 5, wherein the processor further comprises:
   a second downscaler configured to downscale a color image from the color camera;
   an upscaler configured to upscale the signal from the second filter;
   a third filter configured to filter the color image, downscaled by the second downscaler, based on the signal from the upscaler;
   a second boundary refiner configured to refine a boundary signal of the color image from the third filter; and
   a fourth filter configured to filter the signal from the second boundary refiner.

7. The camera device of claim 6, wherein the processor further comprises:
   a second upscaler configured to upscale the downscaled color image from the fourth filter; and
   a fifth filter configured to filter a signal from the second upscaler to output a foreground object mask.

8. The camera device of claim 7, wherein the processor comprises:
- a third downscaler configured to downscale a color image from the color camera;
- a sixth filter configured to filter the color image from the third downscaler based on the foreground object mask;
- a third upscaler configured to upscale the color image from the sixth filter;
- a fourth upscaler configured to upscale the foreground object mask; and
- a synthesizer configured to synthesize signals from the third upscaler and the fourth upscaler to output the bokeh image.

9. The camera device of claim 1, wherein the color camera and the IR camera are connected by a connection member, and wherein the connection member is flexible.

10. An electronic apparatus comprising a camera device, wherein the camera device comprises:
- a color camera;
- an IR camera; and
- a processor configured to separate a foreground region and a background region of an IR image from the IR camera, and to filter a color image from the color camera based on the separated foreground or background region, and generate a bokeh image for the color image, wherein the processor comprises:
- a foreground/background separator configured to separate the foreground region and the background region of the IR image from the IR camera;
- a foreground filter configured to filter the foreground region;
- a foreground refiner configured to refine the filtered foreground region;
- a background filter configured to filter the background region; and
- a background refiner configured to refine the filtered background region.

11. The electronic apparatus of claim 10, wherein the processor is configured to separate the foreground region and the background region of the IR image from the IR camera, filter the color image from the color camera based on the separated foreground region, and generate the bokeh image for the color image.

12. The electronic apparatus of claim 10, wherein the processor is configured to generate a foreground object mask based on the filtered color image, and generate the bokeh image for the color image based on the foreground object mask.

* * * * *